(12) United States Patent
Sumiya et al.

(10) Patent No.: US 9,812,167 B2
(45) Date of Patent: Nov. 7, 2017

(54) MAGNETIC TAPE CARTRIDGE

(71) Applicant: FUJIFILM CORPORATION, Minato-ku, Tokyo (JP)

(72) Inventors: Yosuke Sumiya, Kanagawa (JP); Katsuki Asano, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 15/367,192

(22) Filed: Dec. 2, 2016

(65) Prior Publication Data

US 2017/0287526 A1  Oct. 5, 2017

(30) Foreign Application Priority Data

Mar. 30, 2016  (JP) .................. 2016-068490

(51) Int. Cl.
*G11B 23/107* (2006.01)
*G11B 23/04* (2006.01)

(52) U.S. Cl.
CPC .......... *G11B 23/107* (2013.01); *G11B 23/042* (2013.01)

(58) Field of Classification Search
None
See application file for complete search history.

(56) References Cited

U.S. PATENT DOCUMENTS

| | | | | |
|---|---|---|---|---|
| 7,733,597 B2* | 6/2010 | Tada | ................... | G08B 13/2445 360/132 |
| 8,534,586 B2* | 9/2013 | Sumiya | ................ | G11B 23/042 242/332.4 |
| 8,561,931 B2* | 10/2013 | Sumiya | ................ | G11B 23/042 242/332.4 |
| 2007/0058290 A1* | 3/2007 | Tada | ................... | G11B 23/107 360/92.1 |
| 2011/0073698 A1* | 3/2011 | Sumiya | ................ | G11B 23/042 242/348.3 |
| 2011/0075296 A1* | 3/2011 | Sumiya | ................ | G11B 23/042 360/132 |
| 2013/0001343 A1* | 1/2013 | Sumiya | ................ | G11B 23/107 242/348 |
| 2013/0001345 A1* | 1/2013 | Sumiya | ................ | G11B 23/107 242/348.2 |
| 2013/0003275 A1* | 1/2013 | Sumiya | ................ | G11B 23/042 361/679.01 |

FOREIGN PATENT DOCUMENTS

| | | | |
|---|---|---|---|
| JP | 03129804 A | * | 6/1991 |
| JP | 2007-35099 A | | 2/2007 |
| JP | 2008-90942 A | | 4/2008 |

OTHER PUBLICATIONS

"Lessons in Electric Circuits," Chapet 15—Inductors, "Factors Affecting Inductance," copyright 1999-2001.*

* cited by examiner

*Primary Examiner* — Will J Klimowicz
(74) *Attorney, Agent, or Firm* — SOLARIS Intellectual Property Group, PLLC

(57) ABSTRACT

A magnetic tape cartridge includes a substantially rectangular box shaped case that houses, inside a housing area, a single reel wound with a magnetic tape and equipped with a reel plate that is attracted and held by magnetic force when loaded into a drive device, and a metal-containing block that is disposed inside the case and outside the housing area of the reel, and has a proportion of metal by mass to a total mass of metal provided inside the case including the reel equipped with the magnetic tape and the reel plate of 18% or greater.

8 Claims, 8 Drawing Sheets

MAGNETIC TAPE CARTRIDGE

CROSS-REFERENCE TO RELATED APPLICATION

This application is based on and claims priority under 35 USC 119 from Japanese Patent Application No. 2016-068490 filed on Mar. 30, 2016, the disclosure of which is incorporated by reference herein.

BACKGROUND

Technical Field

The present disclosure relates to a magnetic tape cartridge in which a single reel is housed.

Related Art

Magnetic tape cartridges housing a single reel wound with a magnetic tape serving as a data recording and playback medium often hold highly confidential data. There is accordingly a demand to be able to prevent such magnetic tape cartridges from being illicitly taken away, namely, to improve security performance.

Magnetic tape cartridges that use a security tag provide security are conventionally known (see, for example, Japanese Patent Application Laid-Open (JP-A) No. 2008-90942).

Magnetic tape cartridges provided with a short coil formed of metallic foil on an inner face of a case of a flexible disk in order to be sensed at metal detector gates are also conventionally known (see, for example, JP-A No. 2007-35099).

However, in cases in which a security tag is used, dedicated gates are required and security tags corresponding to these dedicated gates need to be provided, and so there is an issue in that the system is high cost. In contrast, metal detector gates are widely used, chiefly for carry-on luggage inspection at airports, and so the system is lower cost than cases in which security tags are used.

However, in cases in which a short coil is provided on the case inner face of the flexible disk, the case inner face needs to be machined, and there is a concern that the case itself might be deformed. Moreover, the short coil is provided inside a housing area of the disk body, and so there is a concern that the case body might be damaged and data lost due to interference with the short coil.

Based on the above factors, when magnetic tape cartridges are employed, it is desirable to adopt a system that uses metal detector gates to prevent the magnetic tape cartridges from being illicitly taken away from the perspective of suppressing an increase in cost, providing that there is no influence on the magnetic tape wound onto the reel.

However, although a magnetic tape cartridge contains screws (iron) for joining together an upper case and a lower case, metal (iron) contained in the magnetic tape, and metal (stainless steel) such as a reel plate and a coil spring, inside the case, the total mass of metal present inside the case is low, and so there is an issue in that the magnetic tape cartridge is not sensed by metal detector gates with normal sensitivity.

SUMMARY

The present disclosure provides a magnetic tape cartridge that is detected passing through metal detector gates, without influencing a magnetic tape.

A magnetic tape cartridge according to the present disclosure includes a substantially rectangular box shaped case that houses, inside a housing area, a single reel wound with a magnetic tape and equipped with a reel plate that is attracted and held by magnetic force when loaded into a drive device, and a metal-containing block that is disposed inside the case and outside the housing area of the reel, and has a proportion of metal by mass to a total mass of metal provided inside the case including the reel equipped with the magnetic tape and the reel plate of 18% or greater.

The present disclosure enables a magnetic tape cartridge to be detected passing through metal detector gates, without influencing the magnetic tape.

BRIEF DESCRIPTION OF THE DRAWINGS

Exemplary embodiments of the present disclosure will be described in detail based on the following figures, wherein.

DETAILED DESCRIPTION

Detailed explanation follows regarding exemplary embodiments according to the present disclosure, based on the drawings. Note that in FIG. 1, for ease of explanation, a load direction of a magnetic tape cartridge 10 into a drive device is indicated by the arrow A, and the arrow A indicates the front direction (front side) of the magnetic tape cartridge 10. The arrow B direction that is orthogonal to the arrow A indicates the right direction (right side) of the magnetic tape cartridge 10. A direction that is orthogonal to both the arrow A direction and the arrow B direction is indicated by the arrow C, which is an upper direction (upper side) of the magnetic tape cartridge 10.

Figure 1:
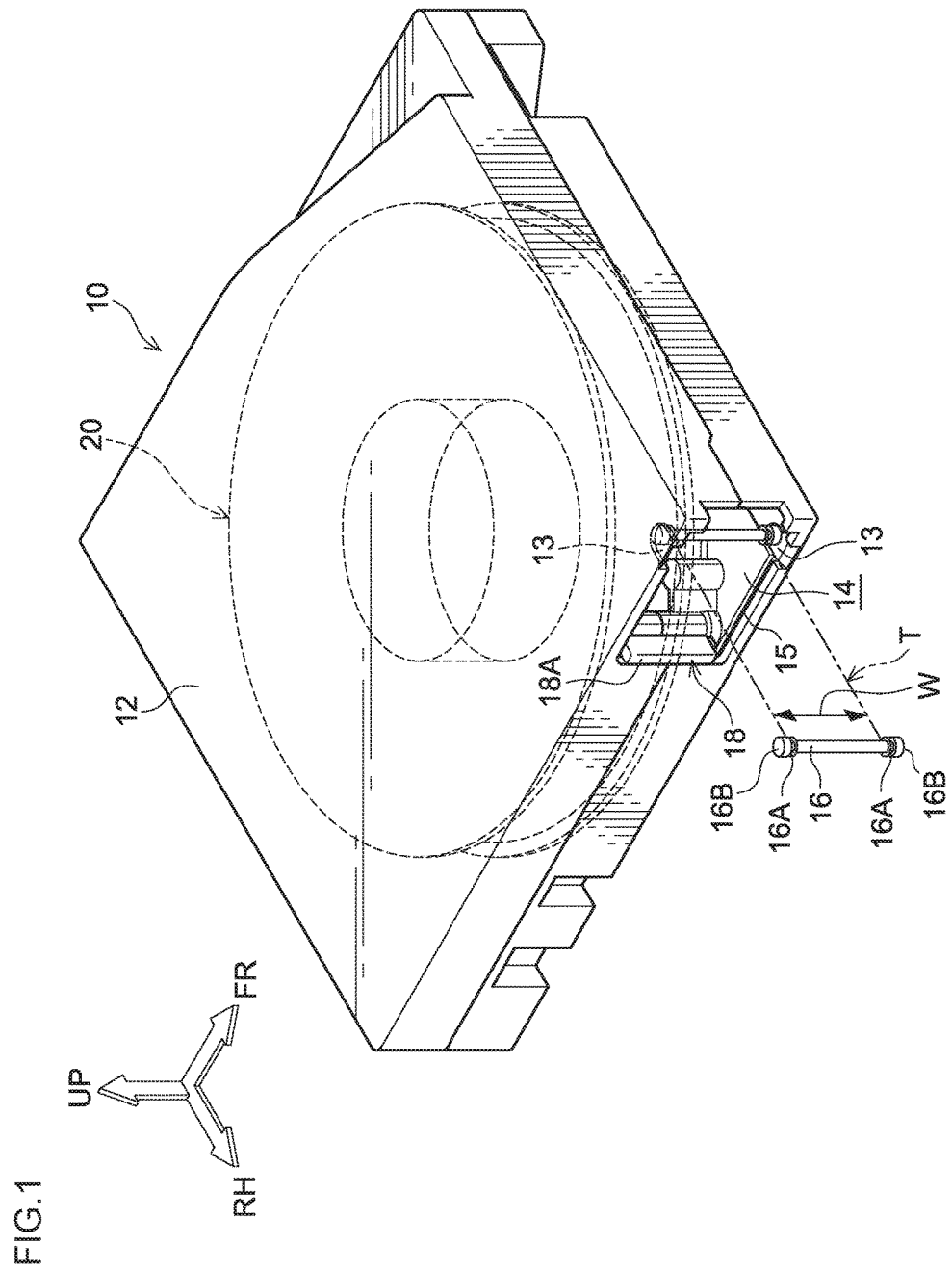
FIG. 1 is a perspective view illustrating a magnetic tape cartridge.
Figure 2:
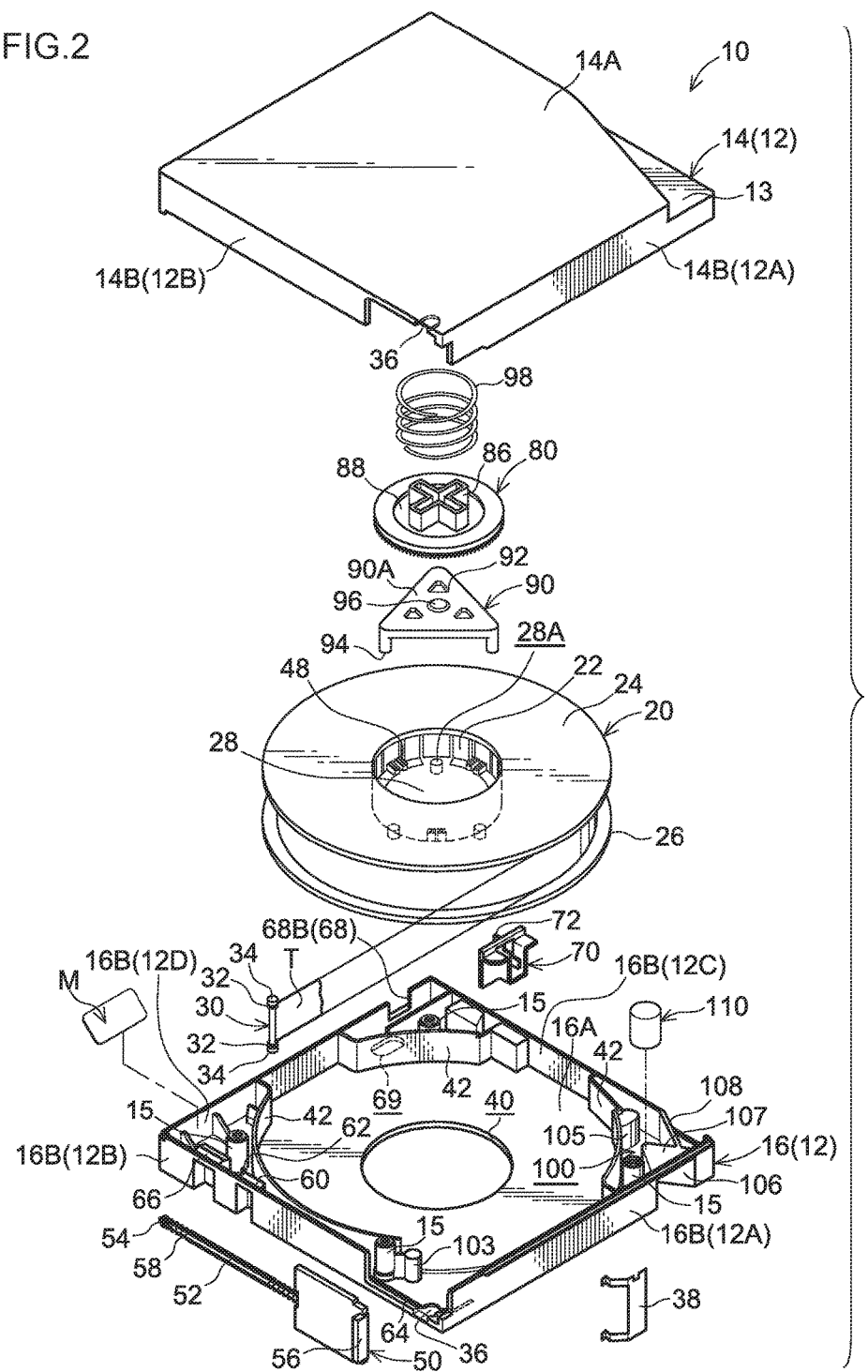
FIG. 2 is an exploded perspective view illustrating a magnetic tape cartridge according to a first exemplary embodiment, as viewed diagonally from above.
Figure 3:
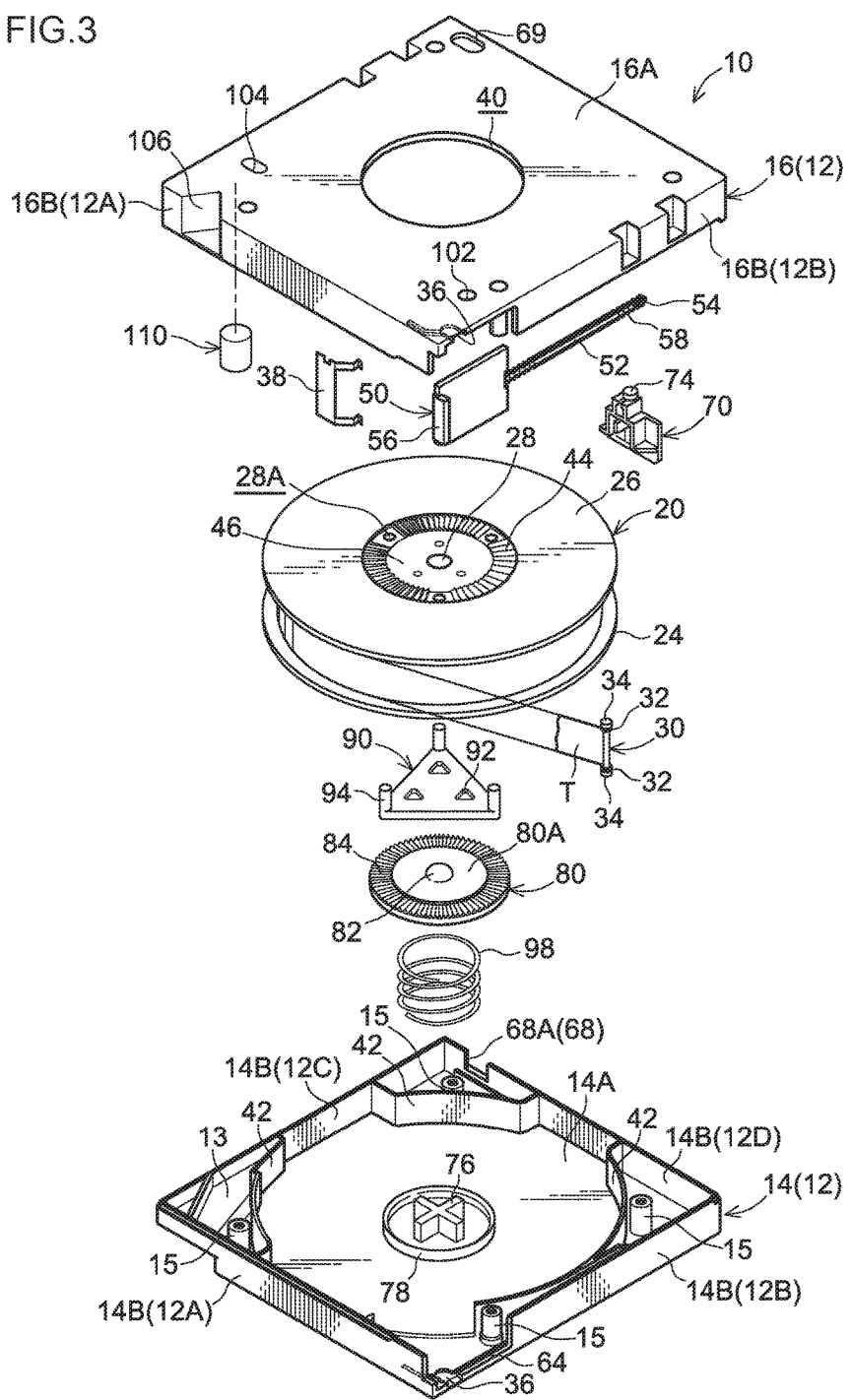
FIG. 3 is an exploded perspective view illustrating a magnetic tape cartridge according to the first exemplary embodiment, as viewed diagonally from below.

As illustrated in FIG. 1 to FIG. 3, the magnetic tape cartridge 10 includes a substantially rectangular box shaped case 12. The case 12 is configured by respectively joining together an upper case 14 and a lower case 16 made of a resin such as polycarbonate (PC) by screw fastening, in a state in which peripheral walls 14B projecting out from peripheral edges of a top plate 14A and peripheral walls 16B projecting out from peripheral edges of a bottom plate 16A abut each other.

Namely, a screw boss 15 is formed close to each corner of the upper case 14 and the lower case 16, and a screw (not illustrated in the drawings) made of iron is screwed into each screw boss 15 from a lower face side of the lower case 16 to assemble the case 12. Note that a step portion 13 that is substantially triangular shaped in plan view is formed at the front left side of the top plate 14A of the upper case 14 in order to prevent incorrect insertion into a drive device (not illustrated in the drawings).

A single reel 20 is housed inside the case 12 so as to be capable of rotating. The reel 20 is configured by integrally molding a bottomed circular tube shaped reel hub 22 configuring an axial center portion and a lower flange 26 provided at a lower end of the reel hub 22, and ultrasonically welding an upper flange 24 to an upper end of the reel hub 22. A magnetic tape T, serving as a data recording and playback medium, is wound onto an outer circumferential face of the reel hub 22. Width direction ends of the wound-on magnetic tape T are protected by the upper flange 24 and the lower flange 26.

A reel gear 44 is formed in a ring shape on a lower face of a bottom wall 28 of the reel hub 22, and a gear opening 40 for exposing the reel gear 44 to the exterior is formed in a central portion of the lower case 16. The reel gear 44 exposed through the gear opening 40 meshes with and is rotation-driven by a drive gear (not illustrated in the drawings) formed on a rotation shaft of the drive device, such that the reel 20 is capable of rotating relative to the case 12 inside the case 12.

A reel plate 46, this being an annular shaped magnetic metal (such as stainless steel) plate, is integrally fixed by insert molding to the lower face of the bottom wall 28 at the radial direction inside of the reel gear 44. The reel plate 46 is attracted to and held by the magnetic force of an annular shaped magnet (not illustrated in the drawings) provided to the rotation shaft of the drive device.

Play restricting walls 42, serving as inner walls, are respectively sectionally provided so as to project out from an inner face of both the upper case 14 and the lower case 16, about a circular trajectory coaxial to the gear opening 40. An inner area surrounded by the play restricting walls 42 configures an inner housing area of the reel 20, and the reel 20 is held by the play restricting walls 42 so as not to rattle.

An opening 18 for pulling out the magnetic tape T that has been wound onto the reel 20 is formed in a right wall 12B of the case 12. A leader pin 30, serving as a leader member that is operated by being pulled out while being anchored to a pull-out member (not illustrated in the drawings) of the drive device, is fixed to a free end of the magnetic tape T pulled out through the opening 18. Annular shaped grooves 32 are respectively formed between both ends 34 of the leader pin 30 and both width direction ends of the magnetic tape T fixed to the leader pin 30, and the annular shaped grooves 32 are anchored to hooks or the like of the pull-out member.

An upper and lower pair of pin retaining portions 36, which position and retain the leader pin 30 inside the case 12, are formed inside the opening 18 of the case 12, namely, in an inner face of the top plate 14A of the upper case 14 and an inner face of the bottom plate 16A of the lower case 16. Each pin retaining portion 36 is formed in a substantially semicircular shape open toward the pull-out side of the magnetic tape T in plan view, and both ends 34 of the leader pin 30 in an upright state are capable of entering and exiting the pin retaining portions 36 from the open side.

A plate spring 38 made of stainless steel is disposed close to the pin retaining portions 36. Bifurcated leading ends of the plate spring 38 are respectively engaged with both ends 34 of the leader pin 30 in the upright state, and the leader pin 30 is retained by the pin retaining portions 36. Note that when the leader pin 30 enters or exits the pin retaining portions 36, the leading ends of the plate spring 38 undergo elastic deformation as appropriate to permit movement of the leader pin 30.

The opening 18 of the case 12 is opened and closed by a door 50. The door 50 is formed in a substantially rectangular plate shape of a size capable of closing off the opening 18. Grooves 64, into which respective upper and lower ends of the door 50 are fitted so as to allow sliding, are formed in the top plate 14A and the bottom plate 16A inside the opening 18, so as to enable the door 50 to move along the right wall 12B of the case 12.

A shaft 52 is provided projecting out from the center of a rear end of the door 50. A coil spring 58 made of stainless steel is fitted onto the shaft 52. A widened portion 54 is formed at a rear end of the shaft 52 to prevent the coil spring 58 from coming off. A support ledge 60, including an anchor portion 62 that anchors a rear end of the coil spring 58 fitted onto the shaft 52, is provided projecting out from the lower case 16.

The door 50 is thereby configured so as to be constantly biased in a direction closing off the opening 18 under biasing force of the coil spring 58, due to the shaft 52 being supported on the support ledge 60 so as to be capable of sliding and the rear end of the coil spring 58 being anchored to the anchor portion 62. Note that it is preferable to also have a support ledge 66 provided projecting out at the rear side of the support ledge 60 to support the shaft 52 when the opening 18 is opened.

A protrusion 56 employed in the opening and closing operation is provided projecting outward at a front end of the door 50. The protrusion 56 engages with an engagement member (not illustrated in the drawings) on the drive device side when the magnetic tape cartridge 10 is loaded into the drive device. The door 50 is configured so as to be opened against the biasing force of the coil spring 58 as a result.

As illustrated in FIG. 2 and FIG. 3, a write-protector 70, serving as a mistaken-erasure prevention member that sets recording to the magnetic tape T as possible or not possible, is provided so as to be capable of sliding in the left-right direction at a rear left portion of the case 12. The write-protector 70 is a sliding component that slides in the left-right direction, and so is molded using polyacetal (POM) that has excellent sliding properties.

An opening hole 68, through which an operating projection 72 for finger-operating the write-protector 70 projects out, is formed in a rear wall 12D of the case 12. The opening hole 68 is configured so as to be formed by a cutout 68A formed in the peripheral wall 14B of the upper case 14 and a cutout 68B formed in the peripheral wall 16B of the lower case 16 when the upper case 14 and the lower case 16 are joined together.

An elongated hole 69, through which a projecting portion 74 of the write-protector 70 is exposed, is formed with its length along the left-right direction in the bottom plate 16A of the lower case 16. When the magnetic tape cartridge 10 has been loaded into the drive device, the position of the write-protector 70 is detected by the drive device, and automatic determination is made as to whether recording to the magnetic tape T is possible or not. Note that the projecting portion 74 does not project out from the bottom plate 16A of the lower case 16.

As illustrated in FIG. 2, a memory board M, which stores various information, such as the recording capacity and recording mode of the magnetic tape cartridge 10, is disposed at a specific angle of incline at a rear right portion (corner) of the case 12. The memory board M is a communication member capable of external communication, and the various pieces of information described above are read and new information is written by an externally provided communication device. Note that a communicable distance with the memory board M is approximately 30 mm.

As illustrated in FIG. 2 and FIG. 3, plural (three at spacings of 120°, for example) engagement gears 48 are provided projecting out at specific intervals (equal spacings) from a peripheral edge of an upper face of the bottom wall 28 of the reel hub 22. Plural (three at spacings of 120° in this case) through-holes 28A are formed between the respective engagement gears 48 at specific positions above the reel gear 44. A circular plate shaped brake member 80 molded using a resin material is provided at the radial direction inside of the reel hub 22.

A brake gear 84 that is capable of meshing with the engagement gears 48 is formed in an annular shape at a circumferential edge of a lower face 80A of the brake member 80. An engagement projection 86, formed in a substantially cross-shape in plan view and inserted with a rotation restricting rib 76 provided projecting downward in a substantially cross-shape in plan view from the inner face of the top plate 14A of the upper case 14, is provided projecting out from an upper face of the brake member 80 to a height that is slightly higher than the height of the rotation restricting rib 76. The brake member 80 is thereby incapable of rotating with respect to the case 12 (upper case 14), but is capable of moving in the up-down direction at the radial direction inside of the reel hub 22.

A compression coil spring 98 made of stainless steel is installed between the upper case 14 and the brake member 80. Namely, the compression coil spring 98 is installed in a state in which one end thereof abuts the inside of an annular shaped projection 78 provided projecting out at the outside of the rotation restricting rib 76 of the upper case 14 (abuts between the rotation restricting rib 76 and the annular shaped projection 78), and another end thereof abuts the radial direction inside of an annular shaped groove 88 provided on the upper face of the brake member 80. The brake member 80 is constantly biased downward under biasing force of the compression coil spring 98.

Thus, when the magnetic tape cartridge 10 is not loaded into the drive device and is not being used, the brake gear 84 is in a state constantly meshing with the engagement gears 48, and is in a locked rotation state in which rotation relative to the case 12 of the reel 20 is prevented. Note that the reel 20 is pressed against the lower case 16 side under the biasing force of the compression coil spring 98 and exposes the reel gear 44 through the gear opening 40 when in the locked rotation state.

A release member 90, which has a substantially equilateral triangular shape in plan view and is molded using a resin material, is provided at the radial direction inside of the reel hub 22 and at the lower side of the brake member 80 (between the bottom wall 28 and the brake member 80). Plural through-holes 92 are formed in specific shapes in appropriate positions in the release member 90 to reduce the weight of the release member 90. Leg portions 94, which are inserted through the respective through-holes 28A and project out through the lower face of the bottom wall 28 at a specific height from the reel gear 44, are provided projecting out from each apex point on a lower face of the release member 90.

A planar face shaped support protrusion 96 is formed at the center of an upper face 90A of the release member 90, and the support protrusion 96 is abutted by a substantially semispherical shaped release projection 82 provided projecting out at the center of the lower face 80A of the brake member 80. The contact surface area between the brake member 80 and the release member 90 is thereby reduced, and slide resistance when loaded into the drive device and being used (when the reel 20 is rotating) is alleviated.

Positioning cavities 102, 104, respectively inserted with positioning members (not illustrated in the drawings) provided to the drive device when the magnetic tape cartridge 10 has been loaded into the drive device, are formed on a front wall 12A side in a lower face of the bottom plate 16A of the lower case 16, with a separation in the left-right direction therebetween (see FIG. 3). The right side cavity 102 is formed in a substantially circular shape, and the left side cavity 104 is formed in a substantially elliptical shape with its length along the left-right direction.

The magnetic tape cartridge 10 is accordingly configured such that the positioning members are reliably inserted even if the magnetic tape cartridge 10 is loaded into the drive device slightly misaligned in the left-right direction, such that this positional misalignment is corrected. Pocket portions 103, 105, serving as bosses configuring the cavities 102, 104, are formed in protruding shapes (projecting shapes) projecting out toward the upper case 14 side from the inner face of the bottom plate 16A of the lower case 16 (see FIG. 2).

A recess 106 with a substantially "V" shape in a bottom view is formed in the front wall 12A (peripheral wall 16B) at the front side of the cavity 104 (pocket portion 105) of the lower case 16 (see FIG. 1 to FIG. 3). The recess 106 engages with a position restricting member (not illustrated in the drawings) provided to the drive device when the magnetic tape cartridge 10 is loaded into the drive device, thereby positioning the magnetic tape cartridge 10 in the load direction.

Figure 4:
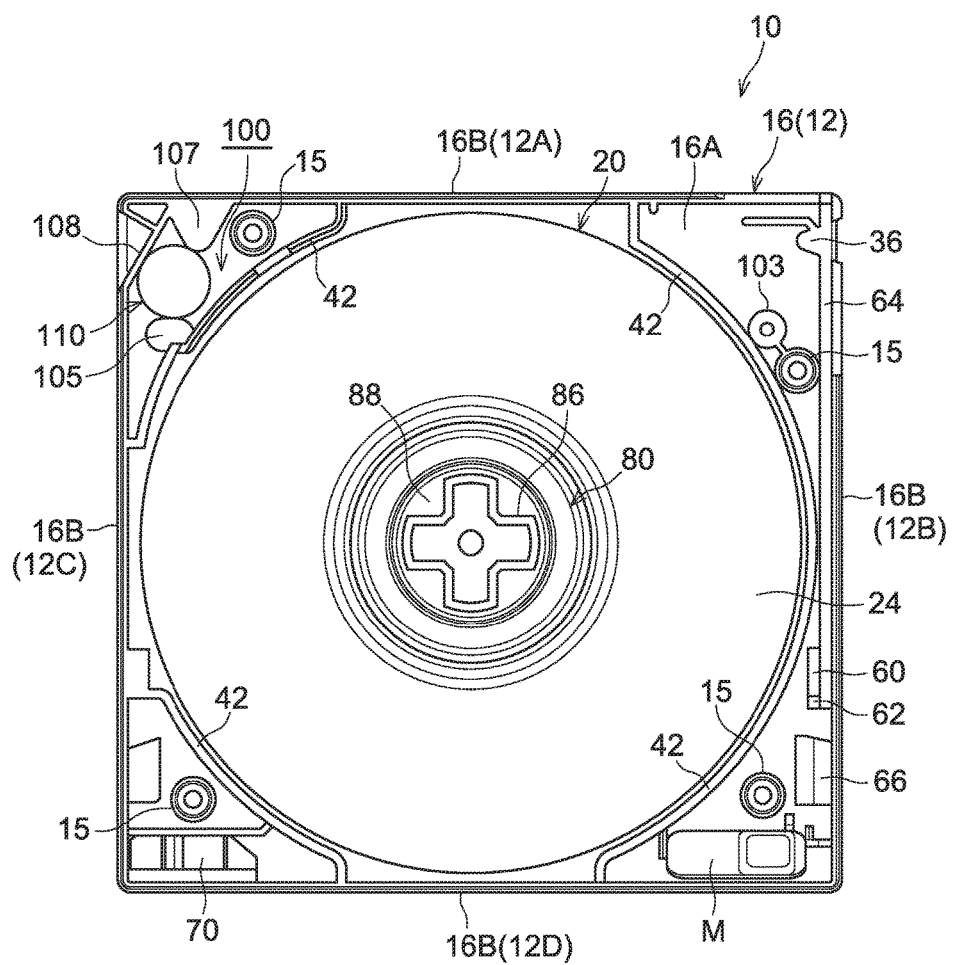
FIG. 4 is a plan view illustrating an inner structure of a magnetic tape cartridge according to the first exemplary embodiment.
Figure 5:
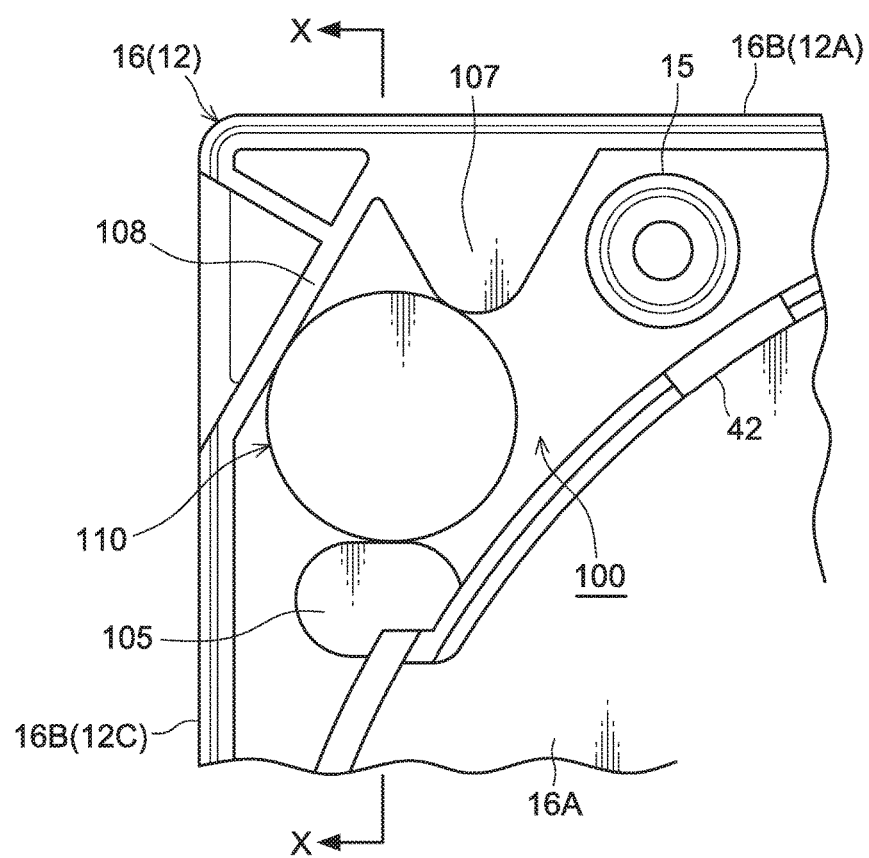
FIG. 5 is a plan view illustrating an enlarged part of an inner structure of a magnetic tape cartridge according to the first exemplary embodiment.
Figure 6:
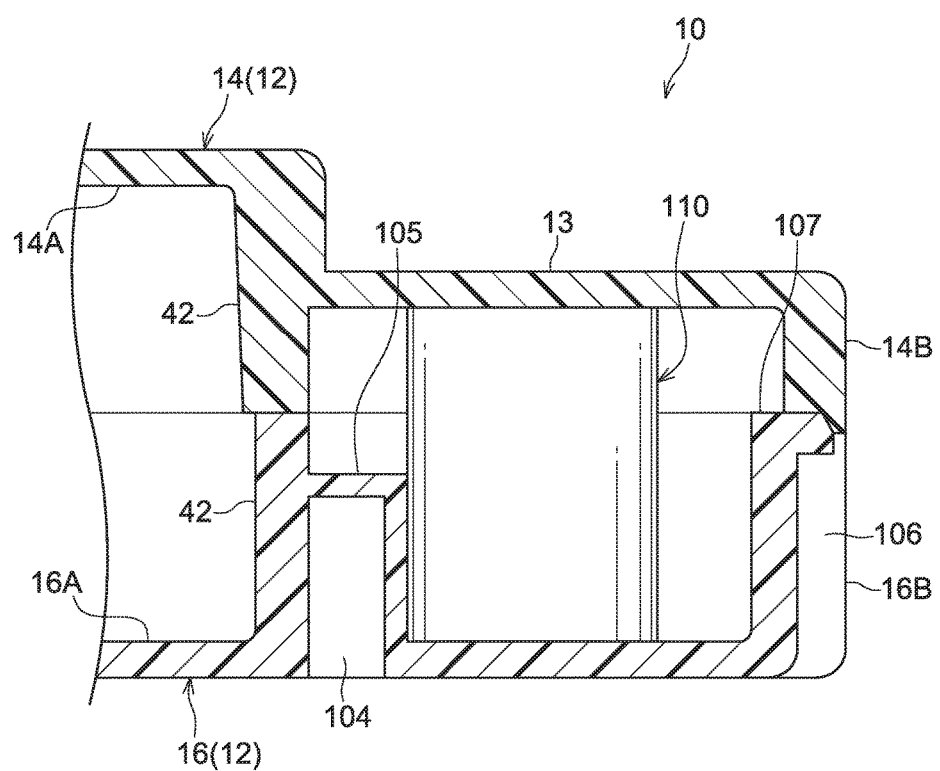
FIG. 6 is a cross-section illustrating an inner structure of a magnetic tape cartridge according to the first exemplary embodiment, viewed from the direction of arrow lines X-X in FIG. 5.

A jutting wall portion 107 (see FIG. 2) is formed jutting out toward the rear in a substantially triangular shape in plan view from an inner face of the front wall 12A (peripheral wall 16B), due to having configured the recess 106. A rib 108 is integrally provided extending from a left side face of the jutting wall portion 107 diagonally toward the rear left. The rib 108 is integrally and continuously provided to a left wall 12C (peripheral wall 16B) of the lower case 16 (see FIG. 4 and FIG. 5 also).

First Exemplary Embodiment

Explanation follows regarding a first exemplary embodiment of a security function provided inside the case 12 of the magnetic tape cartridge 10 configured as described above, based on FIG. 2 to FIG. 6. Namely, explanation follows regarding a metal-containing block 110 provided inside the case 12 in order to prevent the magnetic tape cartridge 10 from being taken out of a specific security area (in order to be detected by metal detector gates).

The metal-containing block 110 is a metal block containing a metal alloy, and the metal may be an iron-based metal, an iron cobalt metal alloy, stainless steel, or nickel. The metal-containing block 110 is formed in a circular column shape, and, as illustrated in FIG. 2 to FIG. 6, is disposed in a front left portion (corner), this being diagonally across from the rear right portion (corner) where the memory board M is disposed inside the case 12, with its axial direction along the up-down direction.

To explain in detail, a space surrounded by the bottom plate 16A of the lower case 16, the rib 108, the jutting wall portion 107, the pocket portion 105, and the step portion 13 of the top plate 14A of the upper case 14 configures a placement space 100, this being outside the housing area of the reel 20 inside the case 12. The metal-containing block 110 is disposed inside the placement space 100, and positioned and retained therein so as not to move.

Namely, the bottom plate 16A of the lower case 16, the rib 108, the jutting wall portion 107, the pocket portion 105, and the step portion 13 of the top plate 14A of the upper case 14 contact the metal-containing block 110 and configure retaining portions that retain the metal-containing block 110. More specifically, a lower face and an upper face of the metal-containing block 110 are retained by the inner face of the bottom plate 16A of the lower case 16 and an inner face of the step portion 13 of the top plate 14A of the upper case 14, and an outer circumferential face of the metal-containing block 110 is retained by an inner face of the rib 108, a side face of the jutting wall portion 107, and a side face of the pocket portion 105.

A proportion of metal by mass of the metal-containing block 110 to the total mass of metal in the magnetic tape cartridge 10 provided inside the case 12 including the reel 20 equipped with the magnetic tape T and the reel plate 46 is 18% or greater. Configuration is thereby such that the metal present inside the case 12 is detected when the magnetic tape cartridge 10 passes through metal detector gates (not illustrated in the drawings) with normal sensitivity.

To explain specifically, in the magnetic tape cartridge 10, the total mass of metal (iron) contained in the screws (iron) for joining the upper case 14 and the lower case 16 together and in the magnetic tape T, and metal (stainless steel) such as the reel plate 46, the plate spring 38, the coil spring 58, and the compression coil spring 98, amounts to 33.8 g. The mass of metal in the circular column shaped metal-containing block 110 that can be disposed in the placement space 100 is 6.2 g.

Note that in metal-containing blocks with a metal mass of 6.0 g, the effectiveness of metal detection by metal detector gates with normal sensitivity is weak, but in the metal-containing block 110 with a metal mass of 6.2 g, the effectiveness of metal detection by metal detector gates with normal sensitivity is strong. 6.0 g is approximately 17.75% of 33.8 g, and 6.2 g is approximately 18.34% of 33.8 g. Thus, this is "18% or greater", as described above.

Note that, from a cost versus effectiveness perspective, it is most preferable to install a metal-containing block 110 with a metal mass of 6.2 g in the placement space 100 of the magnetic tape cartridge 10. Namely, the shape of metal-containing blocks with a metal mass greater than 6.2 g becomes complex, and so the manufacturing cost increases.

The principle behind metal detector gates is electromagnetic induction. An eddy current is generated in a metal by electromagnetic induction when the metal approaches the vicinity of the metal detector gates. The presence of metal is detected by sensing a change in the magnetic field due to the eddy current. Note that the ease of electromagnetic induction is proportionate to the magnetic permeability of a substance. Magnetic metals such as an iron-based metal, an iron cobalt metal alloy, stainless steel, or nickel described above have a high magnetic permeability, and so these metals are easily detected.

Explanation follows regarding operation of the magnetic tape cartridge 10 including the metal-containing block 110 configured as described above.

When the magnetic tape cartridge 10 with the inbuilt metal-containing block 110 passes through metal detector gates disposed facing each other at the entrance and exit to a security area, metal including the metal-containing block 110 present inside the case 12 is detected. Namely, the fact that an attempt is being made to take the magnetic tape cartridge 10 out of the security area is detected. Employing a system in which a warning noise or the like is generated by the security area (metal detector gates) on detecting the metal creates a psychological deterrent that can prevent the magnetic tape cartridge 10 from being taken away illicitly.

Adding the metal-containing block 110 inside the case 12 in this manner enables detection accuracy by the metal detector gates to be improved, thereby enabling the quality of the magnetic tape cartridge 10 capable of detection as metal to be stabilized. Namely, a magnetic tape cartridge 10 augmented with a high performance security function used to prevent theft from a security area can be obtained simply and at low cost, simply by providing the metal-containing block 110 inside the case 12.

Moreover, the metal-containing block 110 that is added to be sensed by the metal detector gates is configured as a dedicated component that is separate from the mechanical components of the magnetic tape cartridge 10, such that the quality of the mechanical components of the magnetic tape cartridge 10 is not lowered as a result. Specifically, the metal-containing block 110 is disposed in the placement space 100 that is both outside the housing area of the reel 20 and is furthest away from the memory board M, such that the magnetic tape T is not influenced, and the communication performance of the memory board M is not negatively affected.

The metal-containing block 110 is formed in a circular column shape, thereby facilitating processing (it suffices to cut a round rod made of a single uniform material) and enabling an increase in cost to be suppressed. The circular column shaped metal-containing block 110 has an important shape in terms of functionality of the magnetic tape cartridge 10 in the case 12, and so its dimensions are positioned and retained in a stable location.

Specifically, the metal-containing block 110 is retained in a state contacting the bottom plate 16A of the lower case 16, the rib 108, the jutting wall portion 107, the pocket portion 105, and the step portion 13 of the top plate 14A of the upper case 14. This enables an increase in cost accompanying an increase in the number of components to be prevented, and enables a reduction in productivity due to an increase in the number of assembly processes to be prevented, compared to configurations in which the metal-containing block 110 is positioned and retained using a non-illustrated holder or the like.

When the location where the metal-containing block 110 is provided is the placement space 100, the metal-containing block 110 is easily stabilized at low cost, and the metal-containing block 110 has excellent ease of insertion into the case 12, thereby enabling the ease of assembly of the entire magnetic tape cartridge 10 to be improved (enabling the suitability of the magnetic tape cartridge 10 for automated assembly to be secured).

By placing the metal-containing block 110 so as not to move in the fixed position that is the placement space 100, the position of the center of gravity of the magnetic tape cartridge 10 can be stabilized. This can contribute to preventing the magnetic tape cartridge 10 from being dropped when handled (enables the suitability of the magnetic tape cartridge 10 for handling to be secured).

Second Exemplary Embodiment

Figure 7:
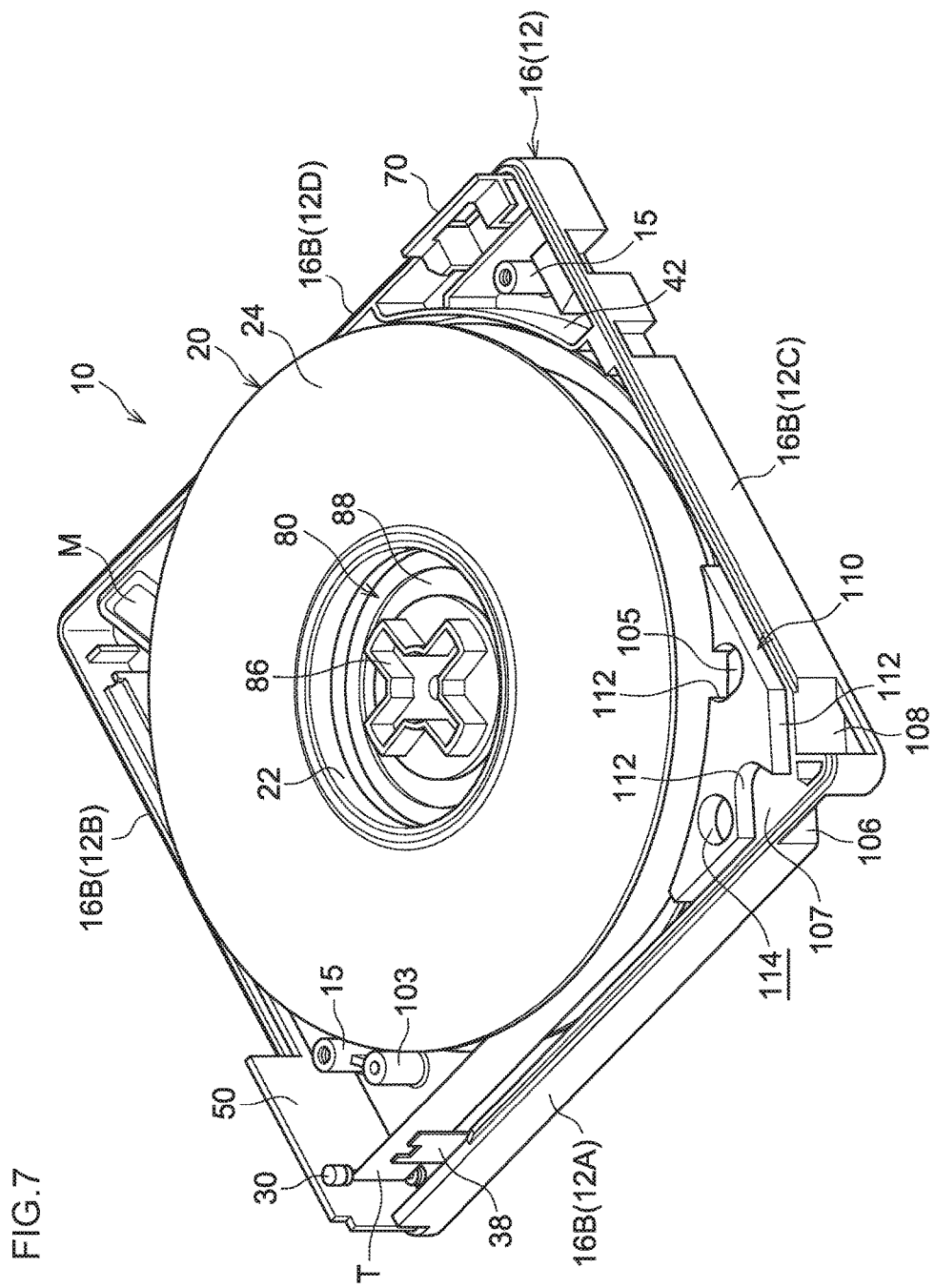
FIG. 7 is a perspective view illustrating an inner structure of a magnetic tape cartridge according to a second exemplary embodiment, viewed from above.
Figure 8:
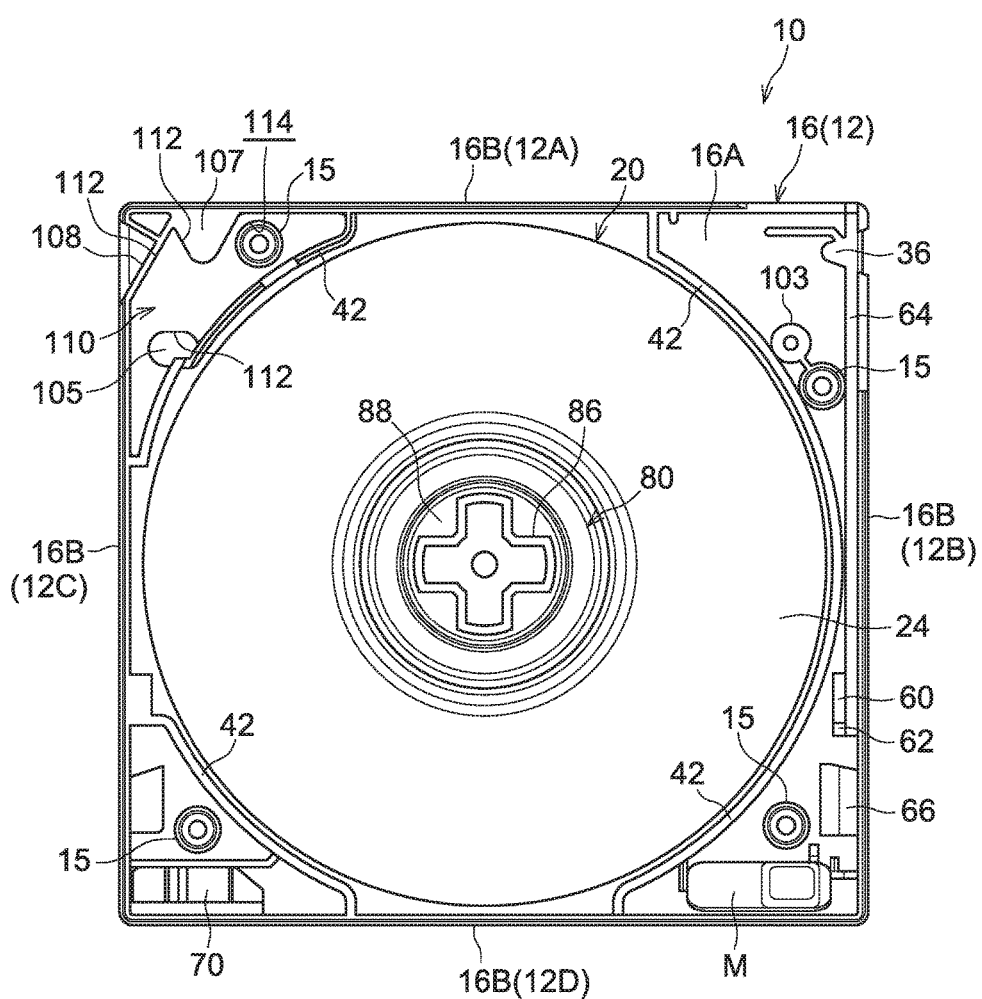
FIG. 8 is a plan view illustrating an inner structure of a magnetic tape cartridge according to the second exemplary embodiment.

Explanation follows regarding a second exemplary embodiment of a security function provided inside the case 12, based on FIG. 7 and FIG. 8. Note that similar locations to those in the first exemplary embodiment are appended with the same reference numerals, and detailed explanation (including common operation) thereof is omitted as appropriate.

Rather than being a metal block, a metal-containing block 110 according to the second exemplary embodiment is a resin block formed with a resin containing metal particles formed of an iron-based metal, an iron cobalt metal alloy, stainless steel, or nickel as a material. Similarly to in the first exemplary embodiment, the metal-containing block 110 is disposed in the front left portion (corner) diagonally across from the rear right portion (corner) where the memory board M is disposed inside the case 12, and is positioned and retained so as not to move.

To explain in detail, the shape of the metal-containing block 110 is the same as the shape outside the housing area at the front left side of the lower case 16 in plan view, and is formed including cutouts 112 that are respectively fitted together with the rib 108, the jutting wall portion 107, and the pocket portion 105, and a through-hole 114 into which a screw-boss 15 is inserted.

Namely, the cutouts 112 are respectively formed in shapes that match the rib 108, the jutting wall portion 107, and the pocket portion 105, and the through-hole 114 is formed in a circular shape with the same inner diameter as the outer diameter of the respective screw boss 15. Thus, although the metal-containing block 110 is formed by injection molding enabling the desired shape to be molded at low cost, the cutouts 112 and the through-hole 114 may be formed by machining, or may be formed using a 3D printer.

The thickness (height) of the metal-containing block 110 is the same as the spacing in the up-down direction between the inner face of the bottom plate 16A of the lower case 16 and the inner face of the step portion 13 of the top plate 14A of the upper case 14. A lower face and an upper face of the metal-containing block 110 are thereby configured so as to be retained by the respective inner face of the bottom plate 16A of the lower case 16 and the inner face of the step portion 13 of the top plate 14A of the upper case 14.

Making the metal-containing block 110 of resin in this manner enables an increase in mass of the overall magnetic tape cartridge 10 to be suppressed, and enables the occurrence of rust on the metal-containing block 110 to be prevented. Note that examples of the resin material used for the metal-containing block 110 include multipurpose plastics and engineering plastics such as polyacetal (POM), polypropylene (PP), polycarbonate (PC), polyamide (PA), and polyethylene (PE).

A proportion of metal by mass of the metal-containing block 110 to the total mass of metal in the magnetic tape cartridge 10 provided inside the case 12 including the reel 20 equipped with the magnetic tape T and the reel plate 46 is 18% or greater. Configuration is thereby such that the metal present inside the case 12 is detected when the magnetic tape cartridge 10 passes through metal detector gates (not illustrated in the drawings) with normal sensitivity, similarly to in the first exemplary embodiment.

Other than the metal-containing block 110, a write-protector 70 formed of a resin material including metal particles formed of an iron-based metal, an iron cobalt metal alloy, stainless steel, or nickel may be injection molded. If the brake member 80, the release member 90, or the door 50, for example, which often have occasion to slide, were molded of a resin material containing metal particles, there would be a concern that the functioning of the magnetic tape cartridge 10 might be influenced. Namely, thereby would be a concern that abraded powder generated by the sliding would have a negative influence inside the drive device or the case 12.

In contrast thereto, the write-protector 70 is seldom used, and is less liable to cause issues. Thus, having metal particles contained in the write-protector 70 enables the metal present inside the case 12 to be increased and enables the detection accuracy by the metal detector gates to be improved, without having an influence on the functioning of the magnetic tape cartridge 10. Using an existing write-protector 70 enables an increase in the number of components to be prevented, and enables an accompanying increase in cost to be suppressed.

Although part of the write-protector 70 is exposed to the exterior, its structure does not allow simple detachment from the case 12. Configuring the write-protector 70 so as to contain metal particles that can be visually recognized from the exterior thereby creates a further psychological deterrent that can prevent illicit removal from the security area. Note that the 18% or greater may be configured by the metal-containing block 110 and the write-protector 70 together. The write-protector 70 of the first exemplary embodiment may be configured containing metal particles.

A magnetic tape cartridge 10 according to respective exemplary embodiments has been explained above based on the drawings; however, the magnetic tape cartridge 10 according to the present exemplary embodiments is not limited to that illustrated in the drawings, and various design modifications may be applied as appropriate within a range not departing from the spirit of the present disclosure. For example, the first exemplary embodiment may be configured such that a recess (not illustrated in the drawings) for fitting a lower portion of the metal-containing block 110 is formed in the inner face of the bottom plate 16A of the lower case 16, and the recess also functions as a retaining portion of the metal-containing block 110.

The metal-containing block 110 according to the first exemplary embodiment is formed in a circular column shape; however, there is no limitation thereto, and the metal-containing block 110 may be formed in a substantially circular column shape without a bottom face being a perfect circle, an angular column shape, a circular tube shape, or the like, as long as the shape formed enables the metal-containing block 110 to be provided in a state retained in the placement space 100. Similarly, the metal-containing block 110 according to the second exemplary embodiment is not limited to the shape illustrated.

The magnetic tape cartridge 10 provided with the metal-containing block 110 is also not limited to that illustrated. Similarly to in the first exemplary embodiment or the second exemplary embodiment, the metal-containing block 110 may be provided to a magnetic tape cartridge (not illustrated in the drawings) using a leader tape or a leader block as a leader member, or to a magnetic tape cartridge (not illustrated in the drawings) that has a lock mechanism for locking rotation of the reel 20 and a release mechanism for releasing this locking that are different mechanisms to those illustrated in the drawings.

What is claimed is:

1. A magnetic tape cartridge comprising:
a case that is substantially rectangular box shaped and that houses, inside a housing area, a single reel wound with a magnetic tape and equipped with a reel plate that is attracted and held by magnetic force when loaded into a drive device; and
a metal-containing block that is disposed inside the case and outside the housing area of the reel, and has a proportion of metal by mass to a total mass of metal provided inside the case including the reel equipped with the magnetic tape and the reel plate of 18% or greater; wherein
metal particles of an iron-based metal, an iron cobalt metal alloy, a stainless steel, or nickel are contained in a mistaken-erasure prevention member made of resin that is provided to the case.

2. The magnetic tape cartridge of claim 1, wherein the case includes a retaining portion that positions and retains the metal-containing block.

3. The magnetic tape cartridge of claim 1, wherein:
a communication member that is capable of external communication is disposed in one corner inside the case; and
the metal-containing block is disposed in a corner diagonally across from the corner where the communication member is disposed.

4. The magnetic tape cartridge of claim 1, wherein the metal-containing block is a metal block containing a metal alloy.

5. The magnetic tape cartridge of claim 4, wherein the metal-containing block is formed in a circular column shape.

6. The magnetic tape cartridge of claim 1, wherein the metal-containing block is a resin block containing metal particles.

7. The magnetic tape cartridge of claim 1, wherein a metal of the metal-containing block is an iron-based metal, an iron cobalt metal alloy, a stainless steel, or nickel.

8. A magnetic tape cartridge comprising:
a case that is substantially rectangular box shaped and that houses, inside a housing area, a single reel wound with a magnetic tape and equipped with a reel plate that is attracted and held by magnetic force when loaded into a drive device; and
a metal-containing block that is disposed inside the case and outside the housing area of the reel, and has a proportion of metal by mass to a total mass of metal provided inside the case including the reel equipped with the magnetic tape and the reel plate of 18% or greater; wherein
the metal-containing block is a mistaken-erasure prevention member made of resin that is provided to the case, metal particles of an iron-based metal, an iron cobalt metal alloy, a stainless steel, or nickel are contained in the mistake-erasure prevention member made of resin that is provided to the case.

* * * * *